Feb. 21, 1939.                W. P. OVERBECK                2,147,918
                          VACUUM TUBE CYCLE COUNTER
                           Filed April 25, 1936
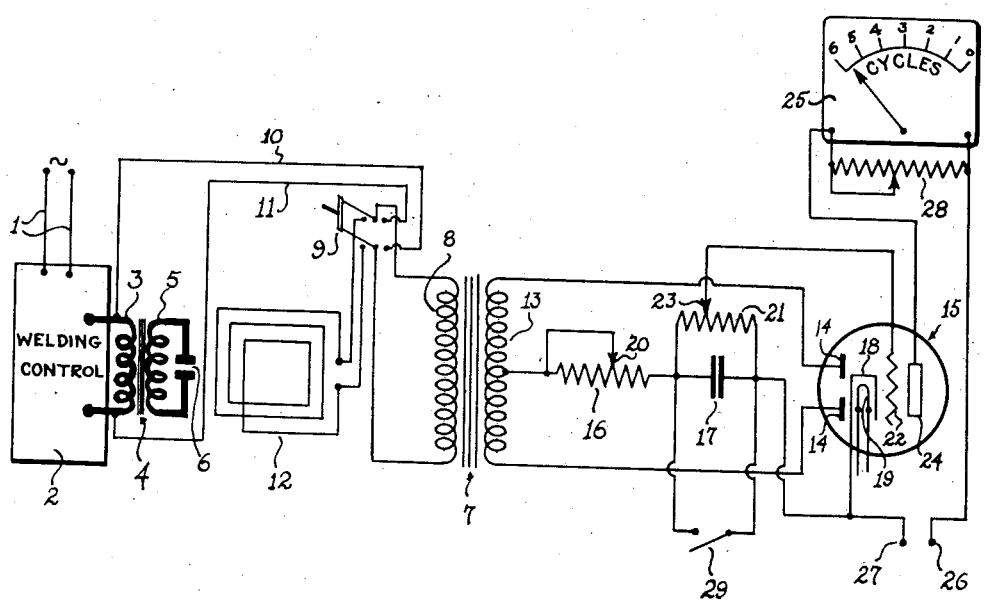
Inventor
WILCOX P. OVERBECK
by Elmer J. Gorn
Attorney Patented Feb. 21, 1939

2,147,918

UNITED STATES PATENT OFFICE 2,147,918

VACUUM TUBE CYCLE COUNTER

Wilcox P. Overbeck, Watertown, Mass., assignor, by mesne assignments, to Raytheon Manufacturing Company, a corporation of Delaware Application April 25, 1936, Serial No. 76,497

6 Claims. (Cl. 175—183)

This invention relates to vacuum tube cycle counters, and more particularly to such a device useful in resistance welding.

An object of this invention is to devise a simple vacuum tube circuit capable of counting the number of cycles in a current impulse, thus rendering it suitable for making a continuous check of the current in successive welds of a resistance welding apparatus.

Another object of this invention is to devise an arrangement whereby the distribution of the current passing through various parts of a resistance weld may be readily determined.

A still further object of this invention is to devise such a vacuum tube circuit which is capable of general application as an alternating current ballistic galvanometer.

The foregoing and other objects of my invention will be best understood from the following description of an exemplification thereof, reference being had to the accompanying drawing, wherein the figure is a diagrammatic representation of one form of circuit embodying this invention.

Recent developments in the art of resistance welding for the manufacture of metal envelope space discharge tubes have introduced complications in measurement technique. In the particular case of space discharge tubes, it is necessary that the welds produced be as perfect as possible in order that the tubes shall not develop leaks. In order to produce such perfect welds, it is necessary that a very close check be had on the number of cycles of current fed to the weld. Since but a few cycles are used in each instance, meters designed for use under steady state conditions obviously cannot be used. The present invention solves the above problem in a very simple and inexpensive manner.

In the figure, alternating current of standard frequency is supplied from input power lines 1 to a welding control 2. The welding control furnishes a predetermined number of cycles to the primary winding 3 of the welding transformer 4. Across the secondary 5 of the welding transformer 4 are placed the welding electrodes 6 between which the article to be welded is placed. In order to indicate directly the number of cycles of current furnished to the primary winding 3, I provide a vacuum tube circuit which is coupled in any suitable manner to the welding circuit through a coupling transformer 7. In the particular embodiment shown I have illustrated two modes of connecting the primary winding 8 of the transformer 7 to the welding circuit. A switch 9 is provided so that either mode of connection may be utilized. When the switch 9 is in the right-hand position, the primary winding 8 is connected directly across the primary winding 3 through the conductors 10 and 11. In the left-hand position of the switch 9, the primary winding 8 is connected across the terminals of a search coil, indicated diagrammatically at 12. The outer terminals of the secondary winding 13 of the transformer 7 are connected directly to the two anodes 14 of a vacuum tube 15 of the type known as a duo-diode triode. The center of the secondary winding 13 is connected through a resistance 16 and a condenser 17 to the cathode 18 of the tube 15. The cathode 18 may be of the indirectly-heated type provided with a heater 19.

The cathode 18 and the two anodes 14 constitute a full-wave rectifier for the alternating voltage which appears across the terminals of the secondary 13. The rectified current flows through the resistance 16, thus charging the condenser 17. In order to control the effect of the resistance 16, it may be provided with an adjustable tap 20. Across the condenser 17 is placed a high resistance 21. Any desired portion of the voltage appearing across the condenser 17 may be impressed upon the grid 22 of the tube 15 by means of an adjustable tap 23 along the resistor 21. The anode 24 of the tube 15 may be connected through a direct-current meter 25 to one terminal 26 of a suitable source of power. The cathode 18 is connected to the other terminal 27 of said source of power. The source of power connected to the terminals 26 and 27 may be either direct or alternating current. In order to adjust the zero reading of the meter 25, an adjustable shunt resistance 28 may be placed across the terminals of the meter 25. The meter 25 may be calibrated in any suitable manner, although I prefer to calibrate it directly in cycles as illustrated. In order to remove the charge across the condenser 17 more quickly than said charge leaks off through the resistance 21, a short-circuiting switch 29 may be connected directly across the condenser 17.

If the switch 9 is placed in the right-hand position when an alternating-current pulse is impressed on the primary winding 3 of the welding transformer 4, a similar alternating-current pulse will be impressed on the primary winding 8 of the transformer 7. This alternating-current pulse is rectified by the circuit described above, and the condenser 17 is charged through the resistor 16. The resistor 16 is chosen of such a value that the time constant of the circuit is large compared to the time of duration of the pulse. Under these conditions the charge received by the condenser 17 and the voltage across it is substantially proportional to the time integral of the voltage of the alternating-current pulse. Due to the fact that the resistor 21 is of a large value, the charge and voltage remain on the condenser 17 for a considerable period of time. This voltage or the portion of it determined by the position of the tap 23 which is impressed upon the grid 22, controls the flow of current to the anode 24 inversely in proportion of the charge on the condenser 17. Thus the voltage on the condenser 17 is measured directly by the meter 25. Since the time integral of the voltage of the alternating-current pulse is directly proportional to the number of cycles supplied to the primary winding 3, where the voltage of the source remains constant, the meter 25 may be calibrated directly in cycles. However, there may actually be a considerable variation in the voltage of the source without introducing an appreciable error in the indication appearing on the meter 25. Thus in a practical circuit, no difficulty was encountered in distinguishing variations of one-half of a cycle.

With the circuit connected and operating as described above, the measurement appears as a sudden deflection of the meter in the anode circuit. This deflection remains fixed while the observation is made. After the observation has been completed, which is a matter of a fraction of a second, the switch 29 may be closed, thereby removing the charge across the condenser 17. The switch 29 may be controlled automatically so that just prior to the operation of the actuating member of the welding control, the switch 29 is closed so as to remove the charge from across the condenser, thus re-conditioning it to enable the device to read the number of cycles in the subsequent weld.

When the measurement of current and voltage distribution through the welding circuit is desired, the switch 9 may be placed in the left-hand position, thus connecting the search coil 12 across the primary winding 3. Since the voltage normally induced in the search coil 12 is considerably less than that which appears across the primary winding 3, the value of the resistance 12 should be considerably less, and preferably the resistor 16 is short-circuited entirely. Under these conditions the reading on the meter 25 will be in the form of values of peak currents or voltages in the particular part of the welding circuit under investigation. The search coil 12 may then be placed in any position in which there is some linkage with the coil 12 of flux created by flow of current through the welding circuit. By placing the search coil in various positions around the weld itself, the distribution of the peak currents or voltages through the weld may be determined.

This invention is not limited to the particular details of construction or use as described above as many equivalents will suggest themselves to those skilled in the art. For example, the device may be useful in other fields where readings of alternating currents of short duration are desired. It will be seen that the device is in effect an alternating-current ballistic galvanometer, and may be used for that purpose wherever desired. Other modifications and equivalents will readily suggest themselves. It is accordingly desired that the appended claims be given a broad interpretation commensurate with the scope of the invention within the art.

What is claimed is:

1. An alternating current-measuring device comprising means for coupling said device to a source of a limited number of alternating current pulses to be measured, means for rectifying the alternating current pulses supplied to said device by said coupling means, a condenser, an impedance in series with said condenser, means for charging said condenser with said rectified current through said impedance, the time constant of the series circuit of said condenser and said impedance being large as compared with the time duration of each of said current pulses and means for directly measuring the voltage appearing across said condenser.

2. An alternating current-measuring device for measuring alternating current pulses, comprising means for coupling said device to a source of a limited number of alternating current pulses to be measured, means for rectifying the alternating current pulses supplied to said device by said coupling means, a condenser, a resistance in series with said condenser, means for charging said condenser with said rectified current through said resistance, the time constant of the series circuit of said condenser and resistance being large compared with the time of duration of each of said current pulses, and means for directly measuring the voltage appearing across said condenser.

3. An alternating current-measuring device comprising means for coupling said device to a source of a limited number of alternating current pulses to be measured, means for rectifying the alternating current pulses supplied to said device by said coupling means, a condenser, an impedance in series with said condenser, means for charging said condenser with said rectified current through said impedance, the time constant of the series circuit of said condenser and said impedance being large as compared with the time duration of each of said current pulses, a space discharge device having a cathode, an anode, and a control electrode; means for impressing the said control electrode a voltage proportional to the voltage across said condenser, and means for measuring the current flowing in the anode circuit.

4. An alternating current-measuring device comprising means for coupling said device to a source of a limited number of alternating current pulses to be measured, means for rectifying the alternating current pulses supplied to said device by said coupling means, a condenser, an impedance in series with said condenser, a leakage resistance across said condenser, means for charging said condenser with said rectified current through said impedance, the time constant of the series circuit of said condenser and said impedance being large as compared with the time duration of each of said current pulses, a space discharge device having a cathode, an anode, and a control electrode, means for impressing on said control electrode a voltage proportional to the voltage across said condenser, and means for measuring the current flowing in the anode circuit.

5. An alternating current-measuring device comprising means for coupling said device to a source of a limited number of alternating current pulses to be measured, means for rectifying the alternating current pulses supplied to said device by said coupling means, a condenser, an impedance in series with said condenser, means for charging said condenser with said rectified current through said impedance, the time constant of the series circuit of said condenser and said impedance being large as compared with the time duration of each of said current pulses, means for directly measuring the voltage appearing across said condenser, and means for short-circuiting said condenser to remove the charge therefrom.

6. An alternating current-measuring device comprising means for coupling said device to a source of a limited number of alternating current pulses to be measured, a space discharge device having a cathode, an anode, a control electrode, and rectifier anodes, said coupling means being connected to said cathode and rectifier anodes to rectify the alternating current pulses supplied to said device by said coupling means, a condenser, an impedance in series with said condenser, means for charging said condenser with said rectified current through said impedance, the time constant of the series circuit of said condenser and said impedance being large as compared with the time duration of each of said current pulses, means for impressing on said control electrode a voltage proportional to the voltage across said condenser, and means for measuring the current flowing in the anode circuit.

WILCOX P. OVERBECK.